US009119265B2

(12) United States Patent
Pan et al.

(10) Patent No.: US 9,119,265 B2
(45) Date of Patent: Aug. 25, 2015

(54) WIRELESS NETWORK BASED PLANT TISSUE CULTURE LED LIGHT SOURCE CONTROL SYSTEM

(76) Inventors: Xuedong Pan, Zhejiang (CN); Hong Zhou, Zhejiang (CN); Xuke Li, Zhejiang (CN); Wenhai Wang, Zhejiang (CN)

( * ) Notice: Subject to any disclaimer, the term of this patent is extended or adjusted under 35 U.S.C. 154(b) by 524 days.

(21) Appl. No.: 13/583,636

(22) PCT Filed: Feb. 24, 2011

(86) PCT No.: PCT/CN2011/071217

§ 371 (c)(1), (2), (4) Date: Sep. 9, 2012

(87) PCT Pub. No.: WO2011/110067

PCT Pub. Date: Sep. 15, 2011

(65) Prior Publication Data

US 2012/0329397 A1 Dec. 27, 2012

(30) Foreign Application Priority Data

Mar. 10, 2010 (CN) .......................... 2010 1 0121695

(51) Int. Cl.

*H04B 7/00* (2006.01)
*H05B 33/08* (2006.01)
*H05B 37/02* (2006.01)

(52) U.S. Cl.

CPC ............ *H05B 33/0863* (2013.01); *H05B 37/02* (2013.01); *H05B 37/0272* (2013.01)

(58) Field of Classification Search

CPC . H04W 52/0212; H04W 84/20; H04W 84/18; H04B 7/269; H05B 33/0863; H05B 37/02; H05B 37/0272

USPC ....................................... 455/41.2, 41.3, 507

See application file for complete search history.

(56) References Cited

U.S. PATENT DOCUMENTS

2007/0184864 A1* 8/2007 Leitch et al. .................. 455/507

FOREIGN PATENT DOCUMENTS

CN 101442423 * 5/2009
CN 1 01521972 * 9/2009

*Primary Examiner* — Ankur Jain
*Assistant Examiner* — Xin Jia
(74) *Attorney, Agent, or Firm* — Global IP Services; Tianhua Gu

(57) ABSTRACT

The invention discloses a ZIGBEE wireless network based plant tissue culture LED (light-emitting diode) light source control system, aiming to solve the problem that a plant tissue culture light source system cannot be monitored and treated with full time sections at present. The invention adopts the technical scheme that the wireless network based plant tissue culture LED light source control system comprises a master control end and a plurality of slave control ends. The system is characterized in that the master control end comprises a first microprocessor, a second microprocessor, a memory, a real-time clock, a display device, a temperature sensor, a humidity sensor, a serial communication interface (SCI), a USB (Universal Serial Bus) communication interface, operation keys and control software embedded in the two microprocessors; and each slave control, end comprises a third microprocessor, an extended memory, a real-time clock, an SCI, a temperature sensor, a humidity sensor, an I/O (input/output) extended interface and control software embedded in the third microprocessor. The invention can be used for carrying out centralized control on LED light, sources in a large-scale field.

6 Claims, 9 Drawing Sheets

WIRELESS NETWORK BASED PLANT TISSUE CULTURE LED LIGHT SOURCE CONTROL SYSTEM

CROSS REFERENCE TO RELATED PATENT APPLICATION

The present application is the US national stage of PCT/CN2011/071217 filed on Feb. 24, 2011, which claims the priority of the Chinese patent application No. 201010121695.0 filed on Mar. 10, 2010, which application is incorporated herein by reference.

FIELD OF THE INVENTION

The invention relates to a wireless network control system, and in particular relates to a ZIGBEE wireless network based plant tissue culture LED fight source control system.

BACKGROUND OF THE INVENTION

The plant tissue culture technology has been almost a century of history, and the study for achieving industrialization production of economic plants through the tissue culture technology is in the ascendant. When the plant tissue culture light source control system is used, a set of light source control system is necessary no matter what light source acts as the tissue culture light, while the technology on the aspect of the light source control system in the market is relatively less, and common devices such as a manual switch, a relay are only adopted mostly, moreover, the switch and the relay both have mechanical loss. The switch operation of any device relys on manual operation, the light source system is difficult to be monitored and treated at full time sections, thus the plants can not be lighted fully at the time section suitable for growing, and the periodic control, is poor.

At present, the improvement task of artificial light sources (such as a filament lamp, a fluorescent lamp, a sodium lamp, a high-pressure mercury lamp) in China is mainly concentrated on the research and development of artificial light sources with lower heat dissipation and higher efficiency, while the research and development on the management aspect of the artificial light source control system is relatively less, especially the LED light source has the advantages of adjustable light intensity and spectrum, low cooling load, high electro-optic conversion efficiency, small volume and long service life, usage of direct-current electricity, the setting of specific wavelength and the like compared with the artificial light sources, and the research and development of the control management system are nearly few.

SUMMARY OF INVENTION

The invention aims to solve the technical problem that the defects of the prior art are overcome, a wireless network based plant tissue culture LED light source control system, is provided, and the centralized control is carried out on the LED light source in a large-scale field, thus the control of the LED light source is intelligentized so as to improve the photosynthesis to plants by the light sources more efficiently and control the growth period of the plants.

So, the following technical scheme is adopted for the invention: a wireless network based plant tissue culture LED light source control system comprises a master control end and a plurality of slave control ends, and is characterized in that the master control end comprises a first microprocessor, a second microprocessor, a memory, a real-time clock, a display device, a temperature sensor, a humidity sensor, a serial communication interface (SCI), a USB (Universal Serial Bus) communication interface, operation keys and control software embedded in the two microprocessors, wherein the first microprocessor is connected with, the second microprocessor through an SPI (serial peripheral interface) bus; the memory is connected with the first microprocessor through a data line; the real-time clock, the display device, the temperature sensor, the humidity sensor and the operation keys are respectively connected with the second microprocessor through the data line; and the SCI and the USB communication interface are arranged on the second microprocessor, and the operation related to setting, sending, receiving of parameters and the like are realized through the mutual match, of the control software and hardware of the two microprocessors.

Each slave control end comprises a third microprocessor, an extended memory, a real-time clock, an SCI, a temperature sensor, a humidity sensor, an I/O (input/output) extended interface and control software embedded in the third microprocessor, wherein the third microprocessor and the first microprocessor are communicated by adopting a ZIGBEE mode; the extended memory, the real-time clock, the temperature sensor and the humidity sensor are respectively connected with the third microprocessor through the data line; and the SCI and the I/O extended interface are arranged on the third microprocessor, and the control software can implement the functions of driving control and receiving for the peripheral hardware circuit of the third microprocessor.

The master control end and the slave control ends are communicated by adopting a ZIGBEE star-like mode. The master control end broadcasts and calls the unique pre-coded and set MAC (media access control) address in the flashes in each slave control end, and the broadcast and called slave control ends send a confirmation, code to the master control end, after the first microprocessor receives the confirmation code information, the confirmation code Information is transmitted to the second microprocessor for judgment and treatment through, the SPI data bus, and the corresponding information of the code, the option of the control, mode, time, date, the temperature and the humidity around the slave control ends is displayed through the display-device. According to out requirements, the parameters of lighting period, time, date, temperature limit value, humidity limit value and the like of the called slave control ends are set, and after all parameters are set, the paramaters are transmitted to the memory of the first microprocessor by the second microprocessor again through the SPI data bus for data packing and transmission. After the third microprocessor of each slave control end receives the data package, the third microprocessor also sends an end massage to the master control end, and then the set parameters sent by the master control end are extracted, and operation instructions of judgment, parameter storage, data execution and the like are carried out. The control software of the mid processor of each slave control end calls parameters of the data, sent by the master control end, the light intensity and light period of the light sources can he controlled, wherein the corresponding plant growth curve regulating program can be set according to the demand quantity of different light quality and light periods at different growth stages of certain plant, and is stored into the extended memory of each slave control end, thus the plant tissue culture light source is controlled by the growth curve set by the program and is regulated automatically.

According to the invention, as long as the relevant parameters of hardware are set, the wireless control network can perform intelligentized operation on each aspect of the light source according to the set parameters under the unmanned condition. The intelligentized operation, provided by the invention can improve the growth quantity and effective ingredients of the plant growth effectively, and solves the problems of high energy consumption, long period and the like in the plant breeding, and shortens the culture period of seedlings extremely.

According to the wireless network based plant tissue culture LED light source control system above, a CC2430 chip is adopted for the first microprocessor, and 51 inner cores are integrated in the chip.

According to the wireless network based plant tissue culture LED light source control system above, a singlechip of the AVRMega series is adopted for the second microprocessor.

According to the wireless network based plant tissue culture LED light source control system above, the temperature sensor is internally provided with a temperature detection circuit and a control circuit, and the humidity sensor is internally provided with a humidity detection circuit and a control circuit.

According to the wireless network based plant tissue culture LED light source control system above, A/D convertion buttons are adopted for the operation buttons.

According to the wireless network based plant tissue culture LED lightsource control system above, a dot-matrix liquid crystal display is adopted for the display device.

Aiming at the defects of poor period control, abrasion of mechanical equipment, high dependence on manual operation, the requirement of professional regulation of long culture period and the like, the invention has the following beneficial effects: the defect of inconvenience of tissue culture wiring is solved; by adopting the starlike wireless control network, only one master control end is needed to control a plurality of slave control ends, and the system extending is convenient; a geographical interface is provided, and is convenient for parameter monitoring and setting; centralized control can be carried out on the LED light source in a large-scale field, the control of the LED light source is intelligentized, the photosynthesis to the plants by the light source is improved much efficiently, and the growing period of the plants is controlled.

The invention is described further by combining the drawings of the specification and particular embodiments as below.

DETAIL DESCRIPTION OF THE INVENTION

Figure 1:
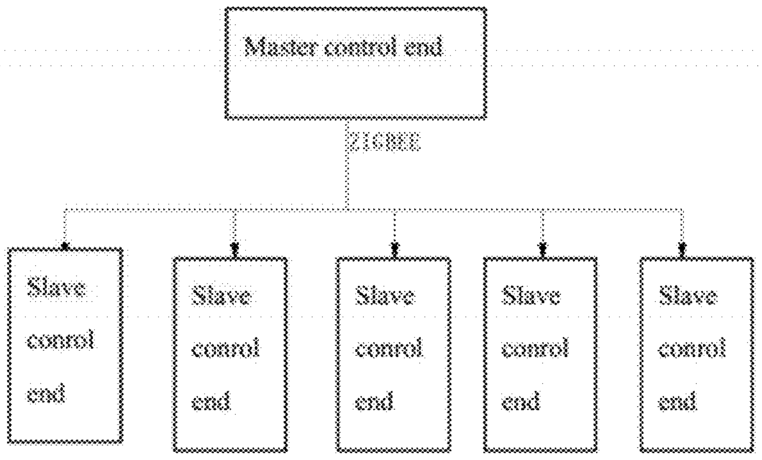
FIG. 1 is the schematic diagram for the invention.

As shown in FIG. 1, a ZIGBEE star-like wireless control technique is adopted for the wireless control network system provided by the invention, and the control platform has high extensibility, can form a large communication application network, and can extend a plurality of application nodes randomly under the condition of no modification or few modification. From FIG. 1, we can see that the wireless network based plant tissue culture LED light source control system provided by the invention consists of a master control end (also named a master controller) and slave control ends (also named slave controllers), and the master control end and the slave control ends are communicated by a ZIGBEE mode. The parameter setting, sending and receiving for the master control end are realized. The slave control ends implement driving control, receives and executes the set parameters sent by the master control end, judges, stores the parameters, and executes the data command.

Figure 2:
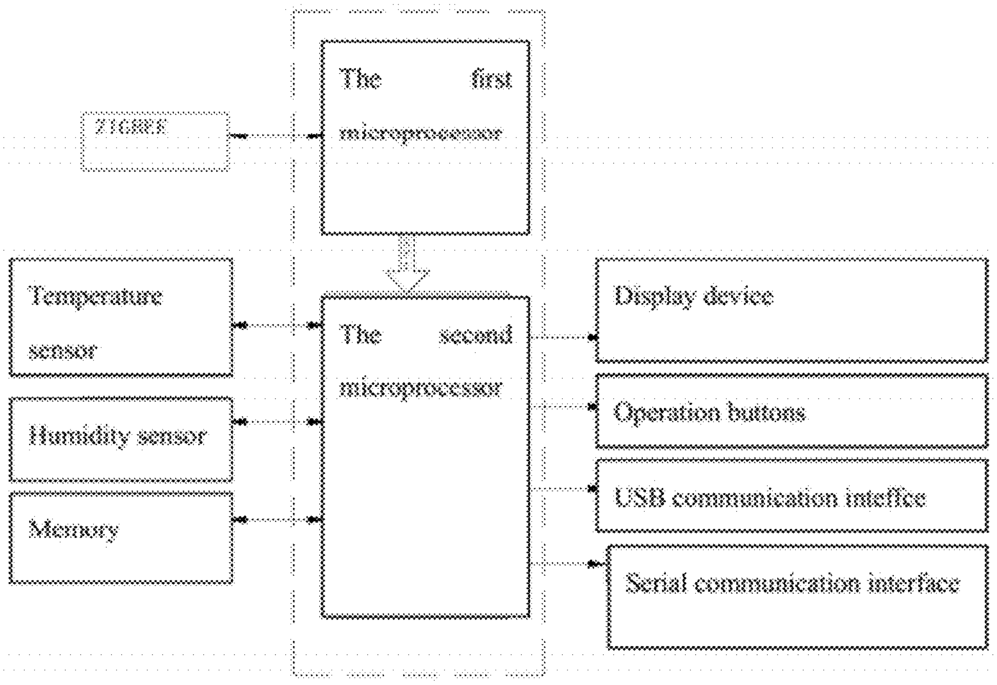
FIG. 2 is the schematic diagram for the master control end for the invention.
Figure 11:
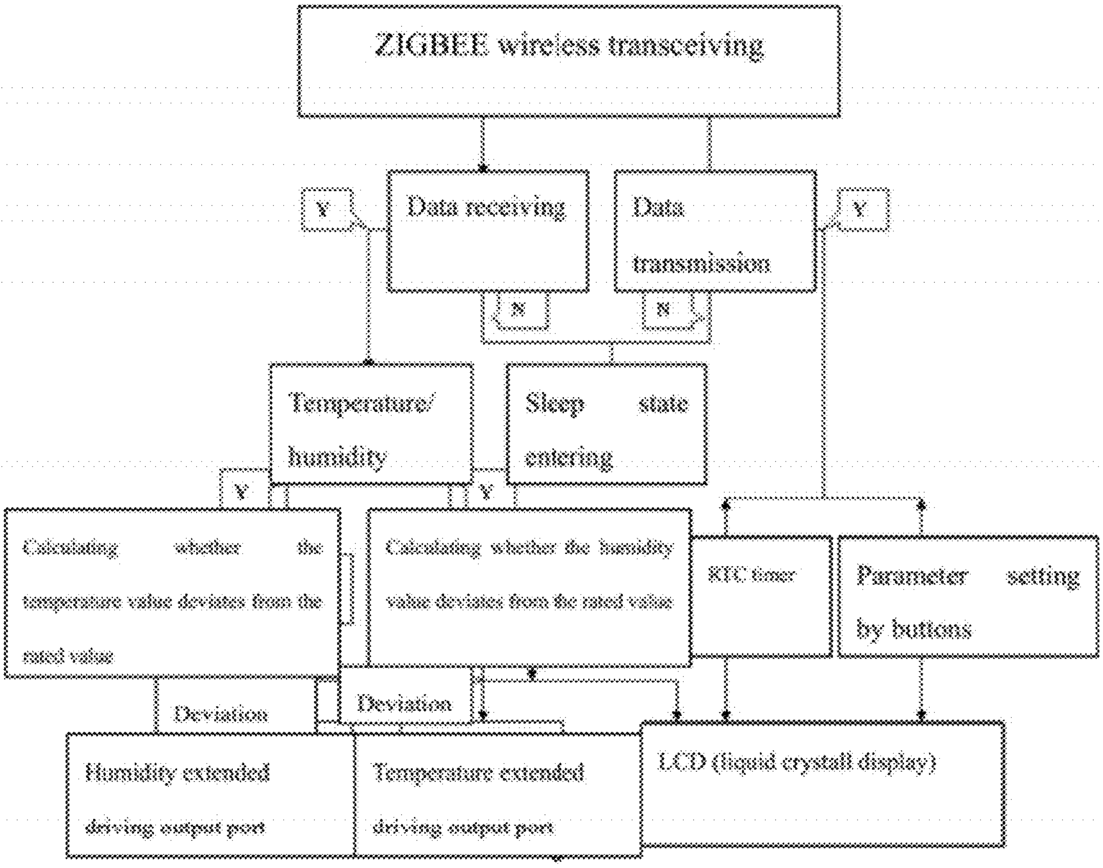
FIG. 11 is the work flow diagram of the control software of the master control end of the invention.

As shown in FIG. 2, two microprocessors are adopted for controlling the master control end, and the master control end comprises a first microprocessor, a second microprocessor, a memory, a real-time clock, a display device, a temperature sensor, a humidity sensor, a serial, communication interface (SCI), a USB (Universal Serial Bus) communication interface, operation, keys and control software embedded, in the two microprocessors (the work flow is shown in FIG. 11), wherein the first microprocessor is connected with the second microprocessor through an SPI (serial peripheral interface) bus; the memory is connected with the first microprocessor through a data line; the real-time clock, the display device, the temperature sensor, the humidity sensor and the operation keys are respectively connected with the second microprocessor through the data line; and the SCI and the USB communication interface are arranged on the second microprocessor, and the operation related to setting, sending, receiving of parameters and the like are realized through the mutual match of the control software and hardware of the two microprocessors.

Figure 3:
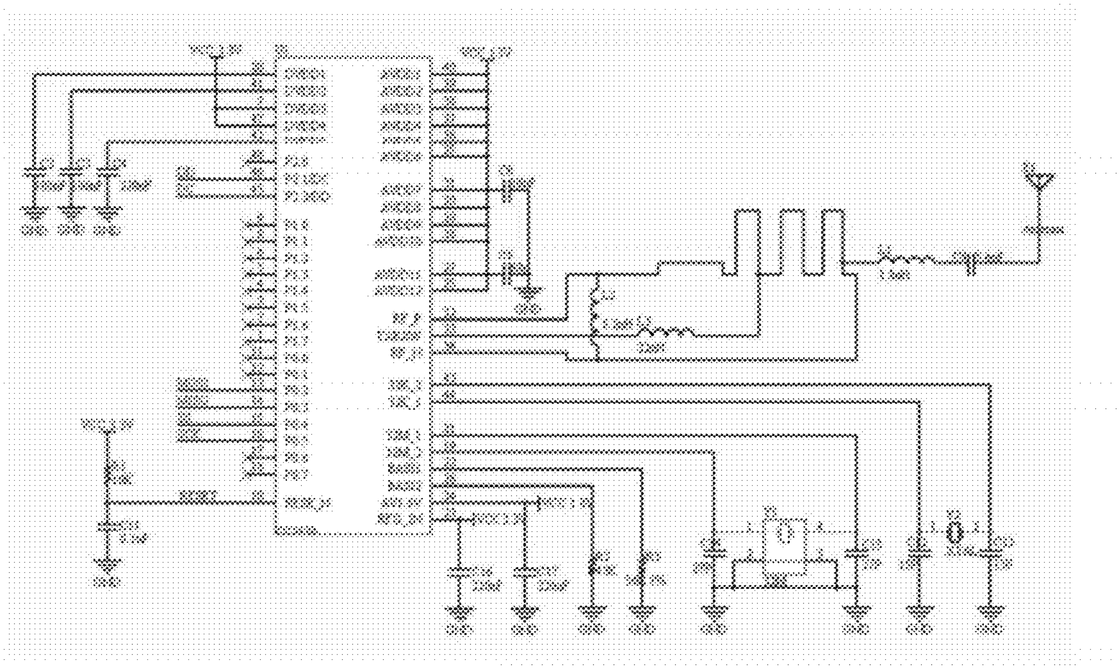
FIG. 3 is the circuit principle diagram of the first microprocessor of the master control end for the invention.

As shown in FIG. 3, a CC2430 receiving and sending control module chip is adopted for the first microprocessor of the master control end, and 51 inner cores are integrated in the chip so as to form multiple wireless control networks and act as a central transceiver station of a wireless control network. For example, the slave control ends send the collected data of temperature, humidity, time and the like to the master control end to treat and judge, and then, the collected data is treated simply in the chip of the third microprocessor of each slave control end, and then is sent to a wireless control transmission port for transmission application. After a transceiver station of the master control end (the first microprocessor of the master control end) detects the data transmission command application of the slave control ends, the transceiver station of the master control end (the first microprocessor) responds to whether the application of the slave control ends receive the transmitted data, and if the slave control ends respond to the receiving, the received data is stored in the memory of the transceiver station (the first microprocessor) temporarily, and the memory and the second microprocessor mutually transmit and exchange data through the SPI bus. If the slave control ends do not respond to the data receiving application, the data is not received. The execution steps of transmission of the master control end are similar, as shown in FIG. 11, the data to be sent is transmitted to the central transceiver station (the first microprocessor) through the SPI bus, and the transceiver station (the first microprocessor) treats the data to be sent and then sends the data to the transmission interface and sends out. But the only difference is that the receiving end of each slave control end should receive and treat the data sent by the master control end.

Figure 4:
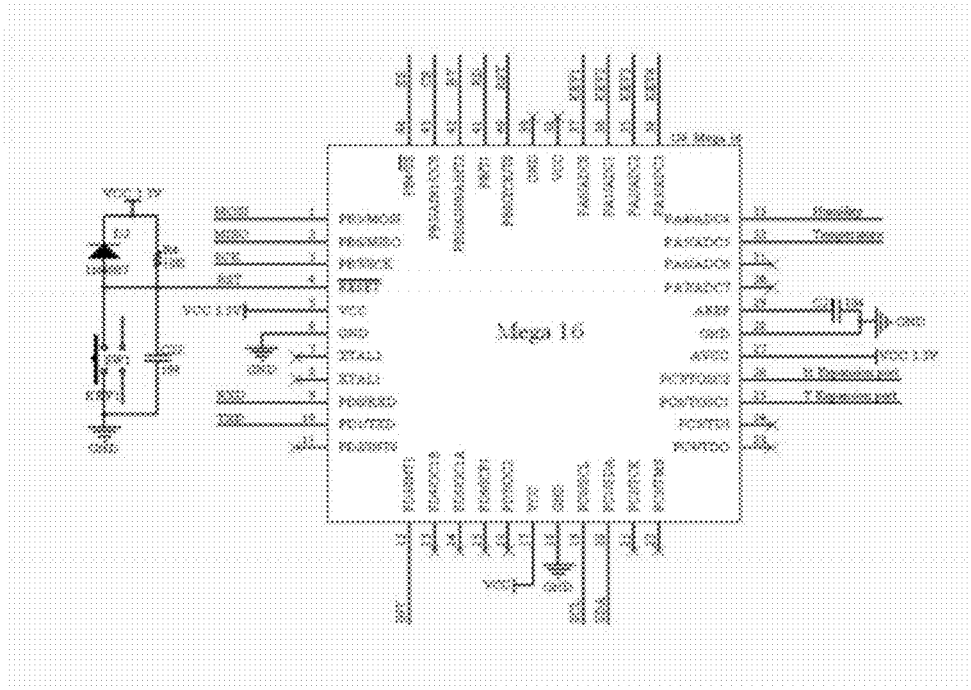
FIG. 4 is the circuit principle diagram of the second microprocessor of the master control end for the invention.

An AVRMega16 singlechip is adopted for the second microprocessor of the master control end shown in FIG. 4.

Figure 5:
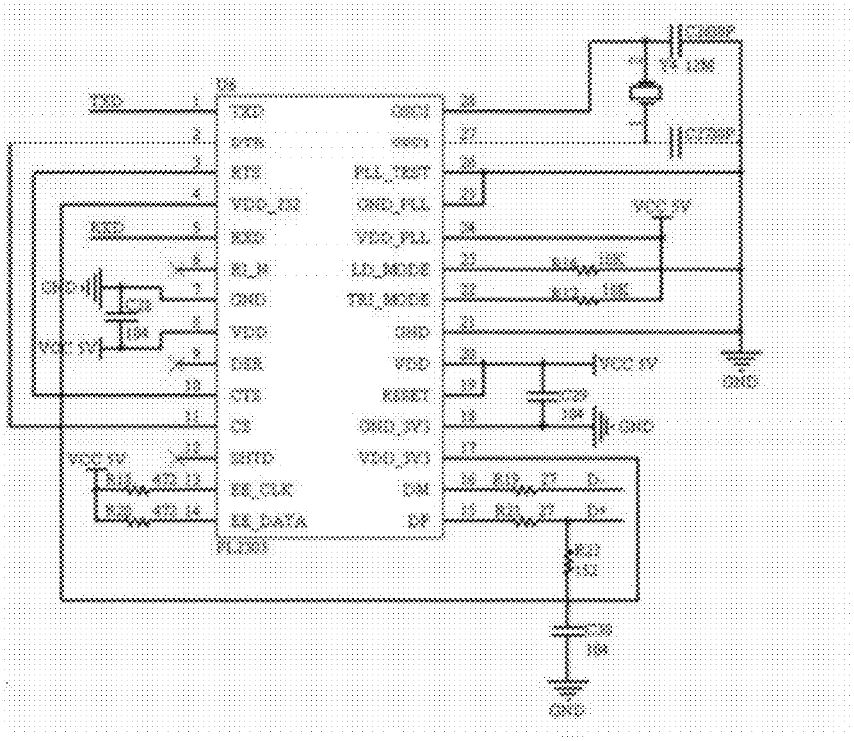
FIG. 5 is the circuit principle diagram of the USB communication, interface of the master control end of the invention.

The USB communication interface shown in FIG. 5 can perform communication and treatment with a PC (personal computer) machine. For example, when in use, we do not know what setting is done to the master control end in practice and which setting is unnecessary, or need to be changed or errors in time and date exist when in use, and we can connect the PC for the operations of rectification, modification and the like.

Figure 6:
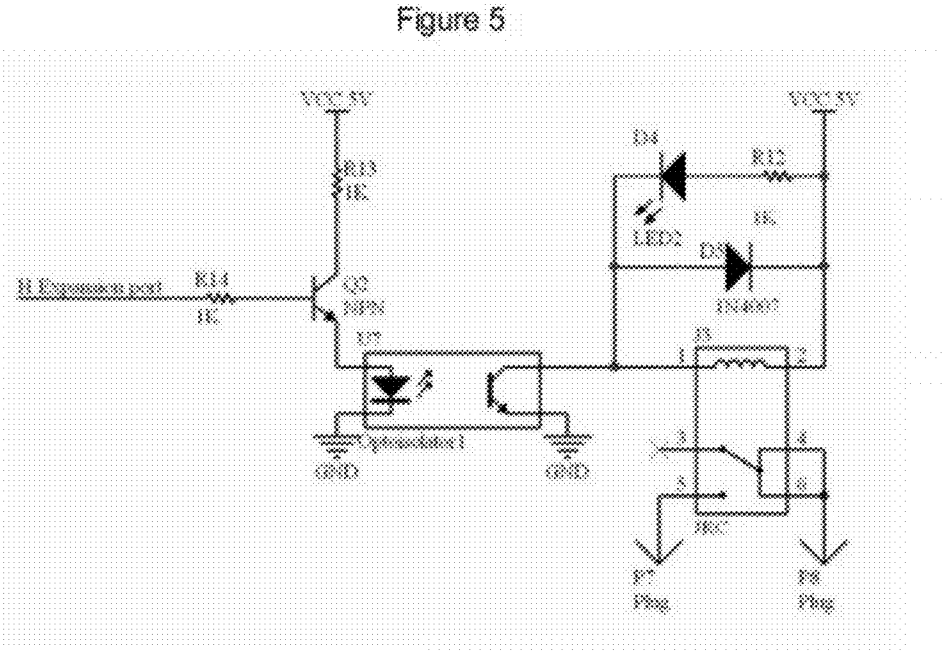
FIG. 6 is the circuit principle diagram of the temperature sensor of the master control end of the invention.
Figure 7:
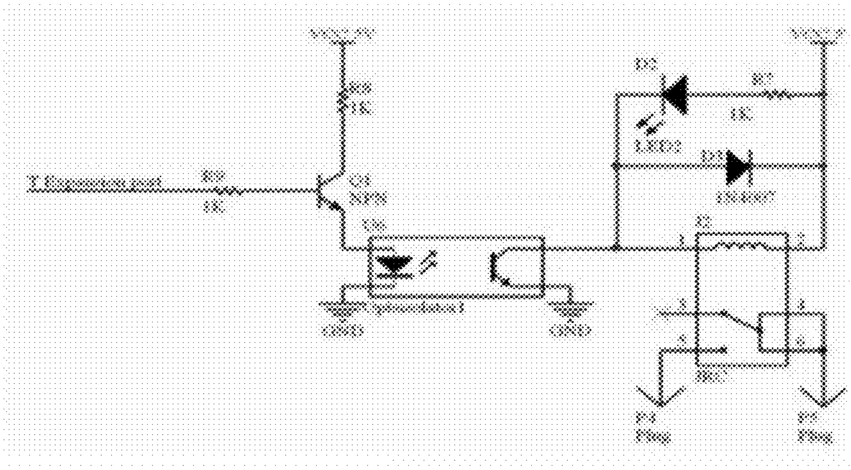
FIG. 7 is the circuit principle diagram of the humidity sensor of the master control end of the invention.
Figure 8:
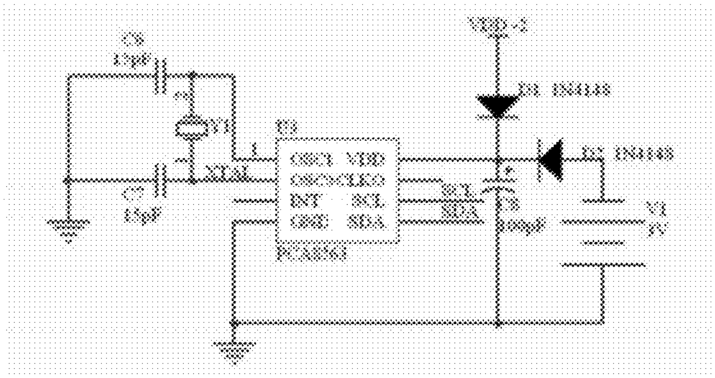
FIG. 8 is the circuit principle diagram of the real-time clock (RTC) of the master control end of the invention.

The humidity sensor is used for collecting the environment humidity for the growth of plants, supplies electricity of DC(direct-current) of 5V by adopting a CHM-02-type sensor, outputs linear voltage value, and has the advantages of high accuracy, long service life and the like. The temperature sensor is used for collecting the environment temperature of growth for the plants, adopts a 18B20-type sensor, outputs digital signals but not traditional analog quantity, has high temperature measuring accuracy, is communicated with the microprocessors by adopting a single line, and only occupies an I/O (input/output) interface, and the occupation quantity of the I/O interfaces of the second microprocessors is reduced. Fore example, the second microprocessor collects the data of the temperature sensor and the humidity sensor, and calculates whether the set temperature value/humidity value is achieved, wherein the initial temperature set in the software is 2-28 DEG C, the initial humidity is set to be 80%-90% of the relative humidity, and parameter value or other types of parameters can be modified through the A/D conversion buttons (see FIG. 9) according to the actual condition. The second microprocessor extracts and detects the data quantity/voltage value of the temperature sensor/humidity sensor for calculation and judgment, if the set value of temperature/humidity is detected to be greater than or less than the initial set value, the second microprocessor outputs high electrical level through setting two I/O interfaces of pin 25 (T Expansion port)/pin 26 (H Expansion port) so as to drive the peripheral control circuit, as shown in FIG. 6 and FIG. 7. Temperature/humidity sensor control ports are controlled by two I/O interfaces 1 of a pin 25 and a pin 26 of the second microprocessor When the I/O interfaces output high electrical level (DC 5V), the I/O interfaces, are connected to a base electrode of a triode with the NPN polarity through a current-limiting resistor. The collector the NPN triode is conducted with an emitting electrode. Because the collector the NPN triode is connected with an external 5V power supply, when the NPN triode is conducted; the power supply of DC 5V is transmitted to the emitting electrode of the NPN triode and a pin 4 of a photoelectric coupler. A pin 3 through the photoelectric coupler forms a loop of current through a grounding system, drives the conduction of the pin 1 and pin 2 of the photoelectric coupler, and intelligently controls the external temperature/humidity sensors and the like, thereby achieving the effective control of the temperature/humidity. From the flow, the NPN triode is adopted and high-voltage anti-interference treatment of circuits of the two electrodes of the photoelectric coupler guarantees the stability of the circuit system, According to the real-time clock circuit schematic principle diagram shown in FIG. 8, the clock device is connected with the second microprocessor, and is used for providing accurate clock control, A PCF8563 clock chip or other clock chips can be utilized, and the PCF8563 clock chip is preferably adopted, and has high, accuracy and mature development of software and hardware. The RTC circuit can help to awaken the second microprocessor from the low-power-consumption sleep, besides, through the scanning and treatment of the A/D conversion buttons by the second microprocessor, if the buttons are at the time set state, the control, software in, the second microprocessor can access the state of the memory address (OOH,O1H) of the RTC chip and program and call the programs of a register, and can set the year, month, date, minute and second of the register of the RTC chip (08H-02H) accurately. By utilizing an interruption source of the RTC chip itself, when the setting of the second microprocessor (OCH-week alarm, OBH-date alarm, OAH-time alarm, 09H-minute alarm) is not involved in the internal operation, the RTC circuit can accumulate and calculate the time, once the accumulated time achieves the set value, an interruption alarm signal is generated in the RFC, and the interruption treatment information is submitted to the second microprocessor through a 12C data general circuit interface. When the second microprocessor treats the application, the second microprocessor treats the application according to the priority level of the interruption source, thus the set time and period can be control led accurately.

Figure 9:
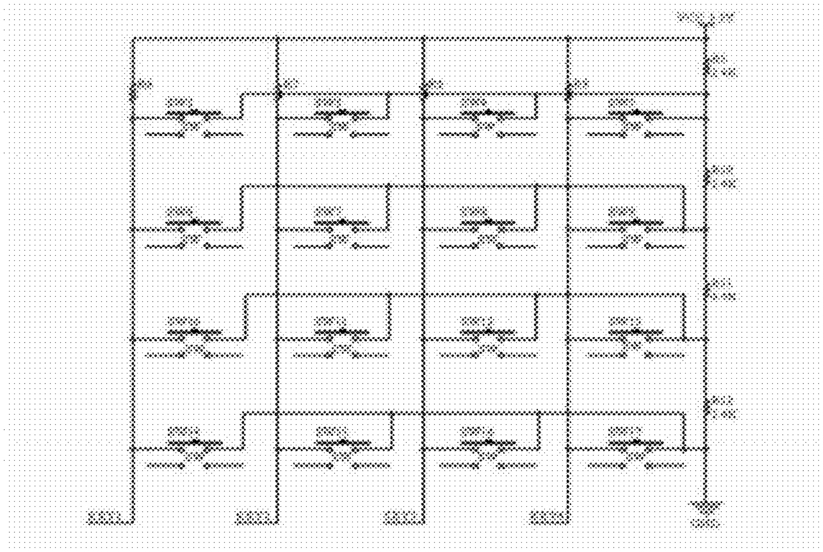
FIG. 9 is the circuit principle diagram of the A/D conversion buttons of the master control end of the invention.

According to the A/D conversion buttons shown, in FIG. 9, the voltage quantity of the buttons is subjected to A/D scanning through the second microprocessor, thus the functional buttons corresponding to the voltage quantity are judged and confirmed. But sometimes, if the same button is operated at the different set function pages, the functions of the button are different. This is the issue of button multiplexing.

The display device is used for displaying the various parameters set by the buttons, and is connected with the second microprocessor for screen brusing control through the SPI data amount by adopting a 128*128 black and white dot-matrix liquid crystal display screen LED.

Figure 10:
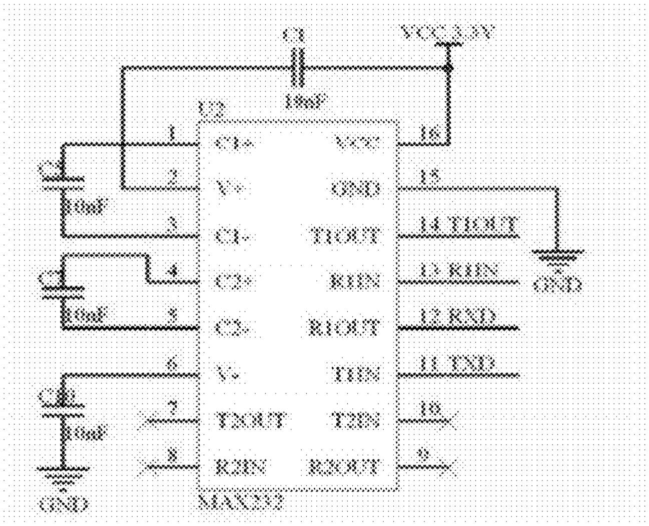
FIG. 10 is the circuit principle diagram of the serial communication interface of the master control end of the invention.

The serial communication interface shown in FIG. 10 is used for debugging the input of data and extended interfaces preserved by the operations of software upgrading and the like. An MAX 3232 chip is preferably adopted, and has wider operating voltage value, and can operate stably and normally in 3-5V.

Figure 12:
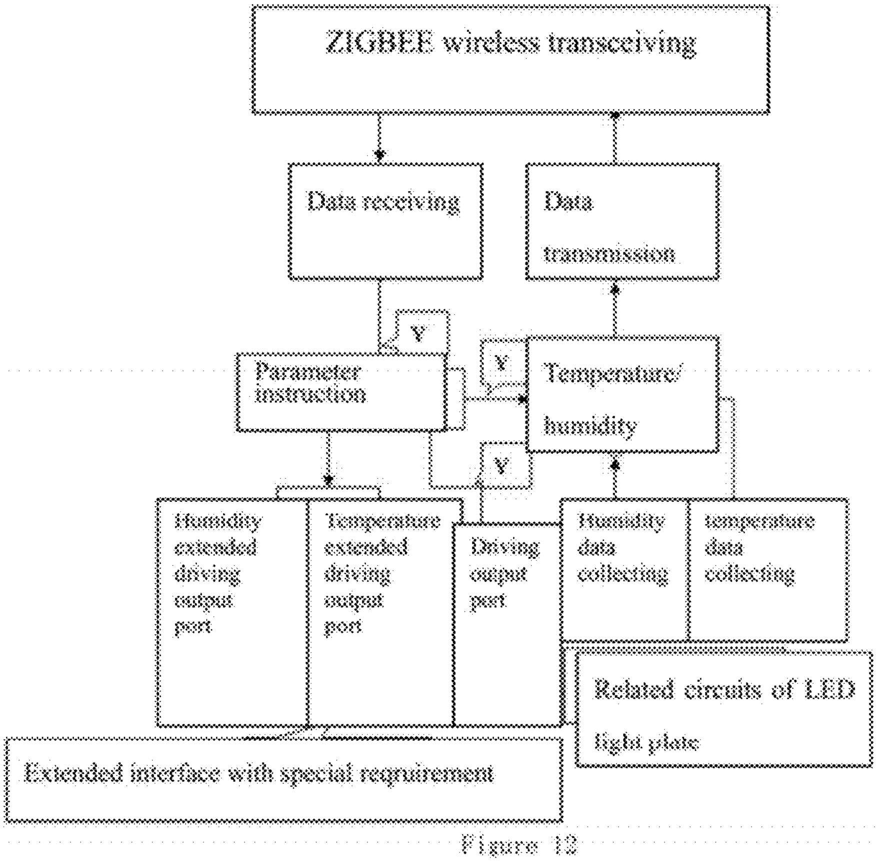
FIG. 12 is the work flow diagram of the control software of the slave control ends of the invention.
Figure 13:
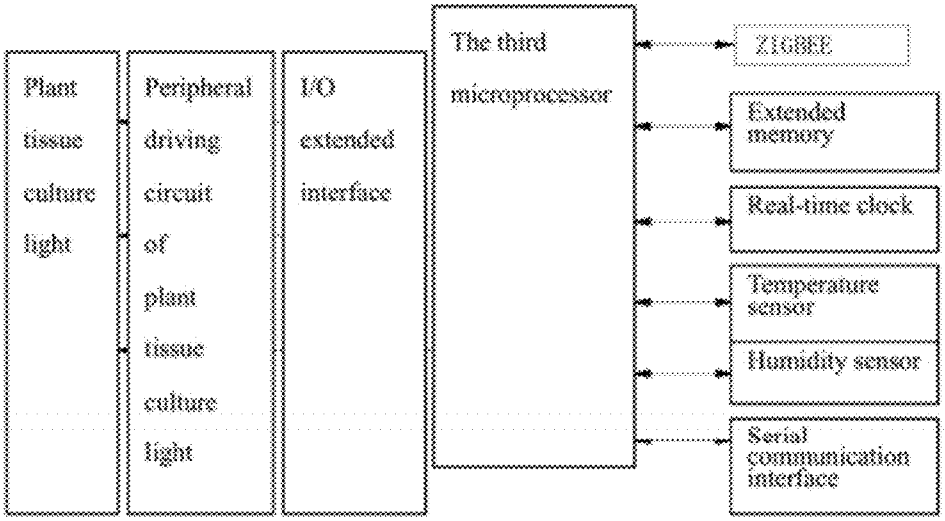
FIG. 13 is the schematic diagram of each slave control end of the invention.

According to the schematic diagram of the slave control ends shown in FIG. 13, the slave control ends are controlled by adopting a single processor, and each slave control end comprises a third microprocessor, an extended memory, a real-time clock, an SCI, a temperature sensor, a humidity sensor, an I/O (input/output) extended interface and control software (the work flow is shown in FIG. 12) embedded in the third microprocessor. The control, software is used for implementing functional operation of driving control, receiving and the like for the peripheral hardware circuit of the third microprocessor. The third microprocessor and the first microprocessor are communicated by adopting a ZIGBEE mode; the extended memory, the real-time clock, the temperature sensor and the humidity sensor are respectively connected with the third microprocessor through the data line; and the SCI and the I/O extended interface are arranged on the third microprocessor.

Figure 14:
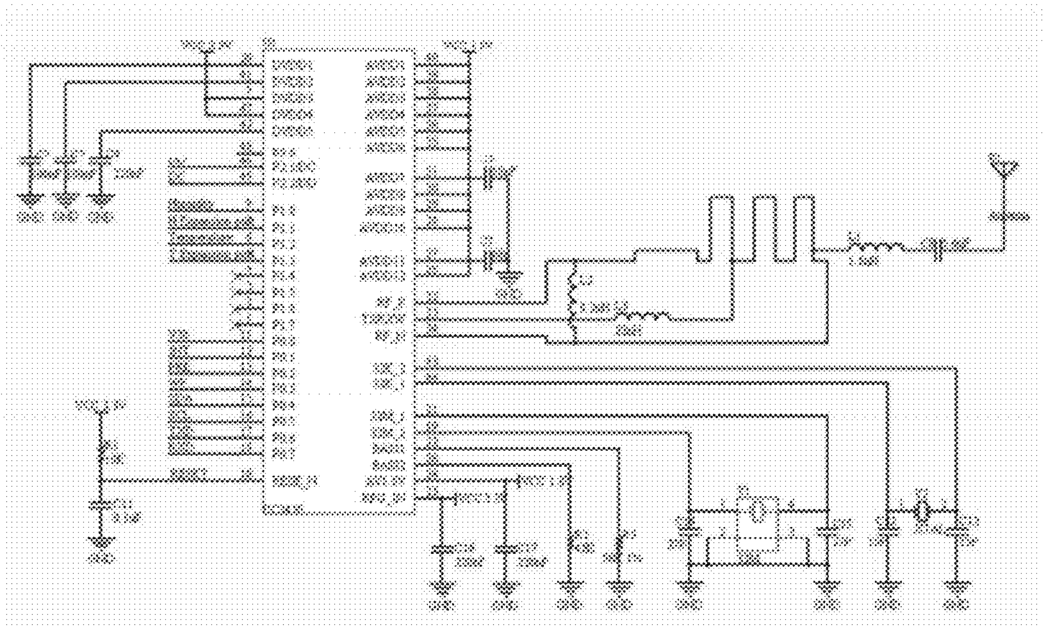
FIG. 14 is the circuit principle diagram of the third microprocessor of each slave control end of the invention.

According to the third microprocessor of each slave control end shown in FIG. 14, a control chip CC2430 of the same type series with the central transceiver station of the master control end is adopted to receive, send and control a module chip, and 51 inner cores are integrated in the chip so as to form multiple wireless control networks, and the control chip CC2430 acts as the receiving and sending terminal in each slave control end, and meanwhile is a core master processor.

For example, the data of temperature, humidity, time and the like collected by each slave control end is treated and judged firstly in the third microprocessor, if the collected data is judged to exceed the normal value, the third microprocessor packs and treats the data exceeding the normal value simply and sends the data into the wireless register in the third microprocessor, and then the data is transmitted out from the transmission port. In order to guarantee that whether the transmitted data is received by the central transceiver station of the master control end, as far as after the central transceiver station of the master control end receives the end data, the central transceiver station of the master control end sends an end confirmation signal of receiving. If the data is sent out at the first time, the master control, end does not send the confirmation signal back, the data is sent out again after one second, and if the data is not received by the master control end at the second time, the parameter sending is canceled from each slave control end. After the master control end receives the data, and sends the confirmation signal from each, slave control end, and the transmission is finished, and the tata communication and transmission, is successful.

The method for transmitting data to the slave control ends by the master control end is mentioned above, we will not repeat any more.

Figure 15:
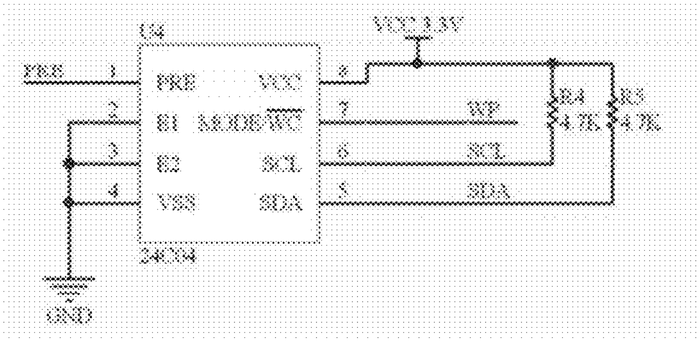
FIG. 15 is the circuit principle diagram of the extended memory of each slave control end of the invention.

According to the extended memory EEPROM shown in FIG. 15, in the third microprocessor in each slave control end, the third microprocessor acts as a transmission and receiving device, and also acts as a main processor. The program codes to be coded and operated basically fill the memory of the third microprocessor, and in actual operation, the slave control ends extract parameter variables continuously from the detection circuit for storage, thus the extended memory shoulded be extended for the third microprocessor so as to meet the requirement of an access space by the control software.

Figure 16:
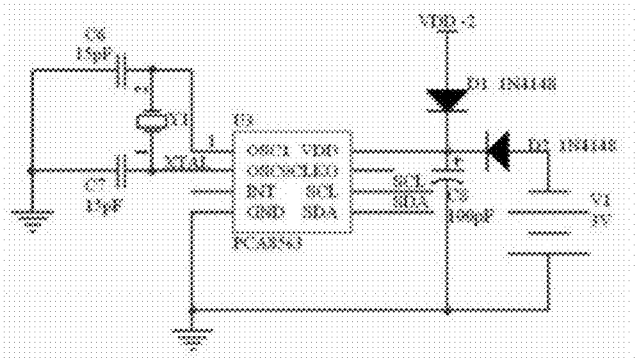
FIG. 16 is the circuit principle diagram of RTC of each slave control end of the invention.

According to the RTC clock circuit schematic principle diagram of each slave control end shown in FIG. 16, the clock device is connected with the third microprocessor, and is used for providing accurate clock control. A PCF8563 clock chip or other clock chips can be utilized, and the PCF8563 clock chip is preferably adopted, and has high accuracy and mature development of software and hardware. The RTC circuit can help to awaken the third microprocessor from the low-power-consumption sleep, besides, can extract the information of (write/read) time, date, interruption alarm and the like through the data sent by each slave control end, thus the control software in the third microprocessor can access the state of the memory address (OOH,O1H) of the RTC chip and program and call the programs of a register, and can set the year, month, date, minute and second of the register of the RTC chip (08H-02H) accurately. By utilizing an interruption source of the RTC chip itself when the setting of the second microprocessor (OCH-week alarm, OBH-date alarm, OAH-time alarm, 09H-minute alarm) is not involved in the internal operation, the RTC circuit can accumulate and calculate the time, once the accumulated time achieves the set value, an interruption alarm signal is generated in the RTC, and the interruption treatment information is submitted to the third microprocessor through a 12C data general circuit interface. When the third microprocessor treats the application, the third microprocessor treats the application according to the priority level of the interruption source, if the result obtained from the treatment draws the electrical level of the corresponding I/O extended interfaces into a high electrical level, the extended control circuits which drive an MOS tube to be conducted or enable a relay to be actuated enable the on-off of the plant tissue culture lamp to be controlled accurately.

Figure 17:
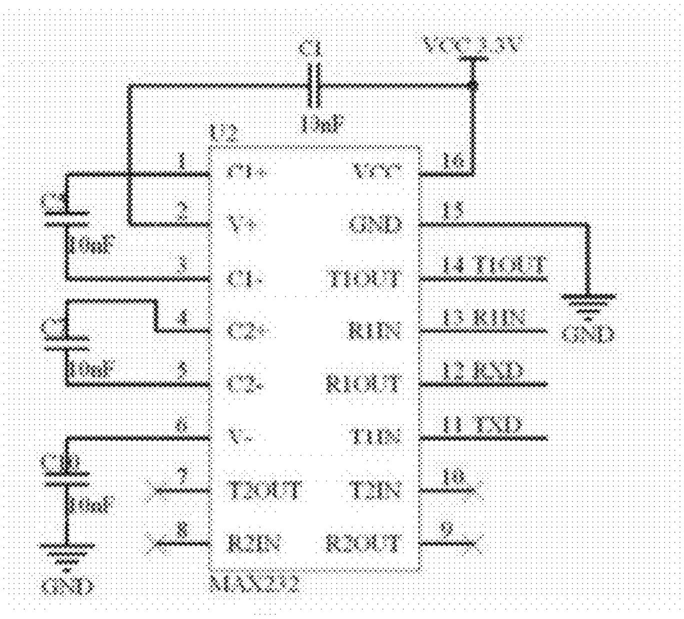
FIG. 17 is the circuit principle diagram of the serial, communication interface of each slave control end of the invention.

The serial communication interface shown in FIG. 17 is used for debugging the extended interfaces preserved by the operations of input of data, software upgrading and the like. An MAX 3232 chip is preferably adopted, and has wider operating voltage value, and can operate stably and normally in 3-5V.

The main aim for increasing a pair of temperature/humidity sensors in each control module is to reach, the constant-temperature and constant-humidity plant growing environment in each area of the tissue culture room with larger area accurately.

The humidity sensor is used for collecting the environment humidity for the growth of plants, supplying electricity of DC(direct-current) of 5V by adopting a CHM-02-type sensor, and outputting linear voltage value, and has the advantages of high accuracy, long service life and the like.

The temperature sensor is used for collecting the environment temperature of growth for the plants, adopts a 18B20-type sensor, outputs digital signals but not traditional analog quantity, has high temperature measuring accuracy, is communicated with the microprocessors by adopting a single line, and only occupies an I/O (input/output) interface, and the occupation quantity of the I/O interfaces of the third microprocessors is reduced.

Figure 18:
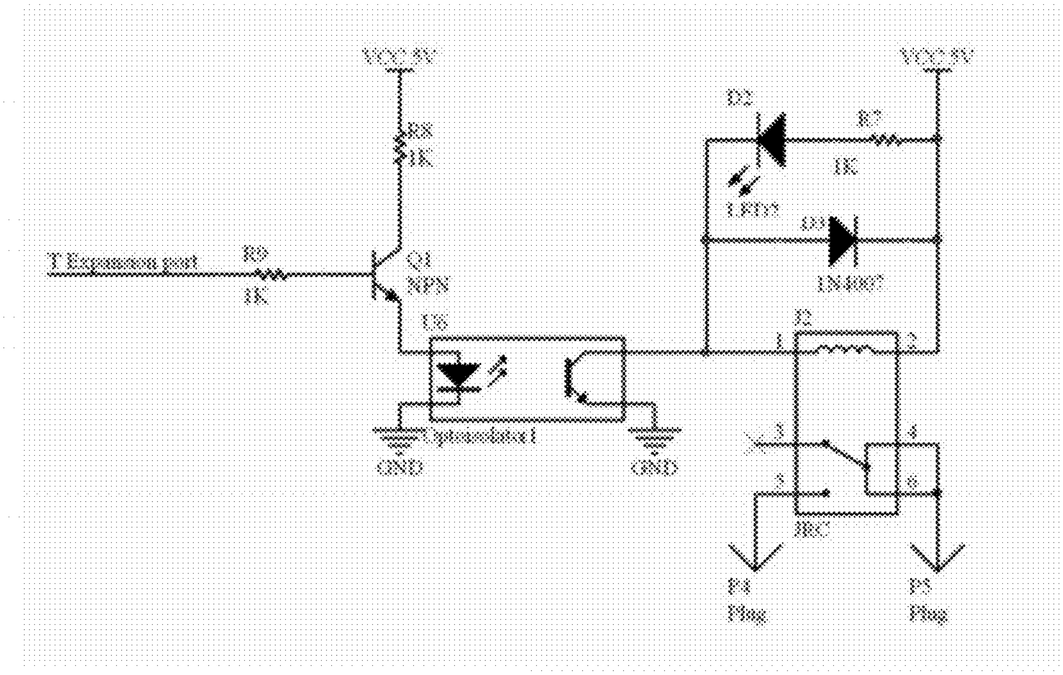
FIG. 18 is the circuit principle diagram of the temperature sensor of each slave control end of the invention.
Figure 19:
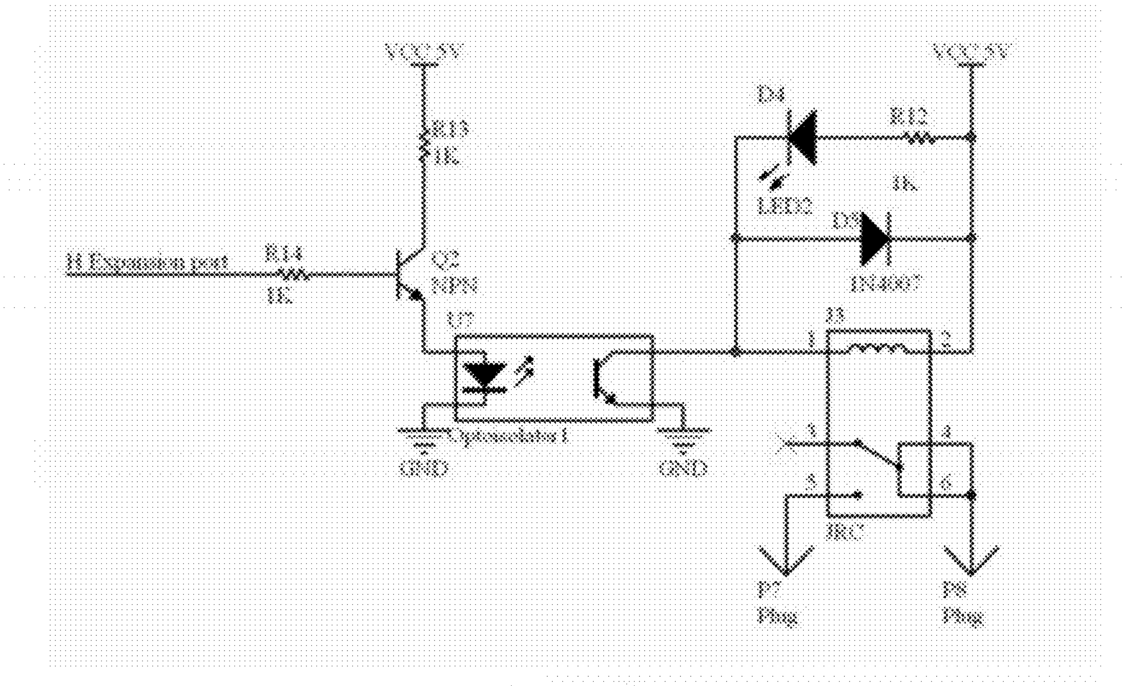
FIG. 19 is the circuit principle diagram of the humidity sensor of each control end of the invention.

Fore example, the third microprocessor collects the data of the temperature sensor and the humidity sensor, and calculates whether the set temperature value/humidity value is achieved, wherein the initial temperature set in the software is between 2 DEG C and 28 DEC C, the initial humidity is set to be 80%-90% of the relative humidity, and parameter value or other types of parameters can be set through the master control end. The third microprocessor extracts and detects the data quantity/voltage value of the temperature sensor/humidity sensor for calculation, and judgment regularly. If the set value of temperature/humidity is detected to greater than or less than the initial set value, the third microprocessor packs and treats the data exceeding the normal value simply and sends the data into the wireless register in the third microprocessor, and then the data is transmitted from the transmission port to the master control end for judgment and treatment. If the master control end performs the operation instructions of temperature dropping/rising and humidity increasing/reduction, and sends the operation instructions to the slave control ends, then the micro processors of the slave control ends outputs high electrical level through setting two I/O interfaces of pin 5 (T Expansion port)/pin 8 (H Expansion port) by programming of calling and the like so as to drive the peripheral control circuit, as shown in FIG. 18 and FIG. 19. Temperature/humidity sensor control ports are controlled by two I/O interfaces 1 of a pin 25 and a pin 26 of the second microprocessor. When the I/O interfaces output high electrical level (DC 5V), the I/O interfaces are connected to a base electrode of a triode with the NPN polarity through a current-limiting resistor. The collector of the NPN triode is conducted with an emitting electrode. Because the collector of the NPN triode is connected with an external 5V power supply, when the NPN triode is conducted, the power supply of DC 5V is transmitted to the emitting electrode of the NPN triode and a pin 4 connected with the photoelectric coupler. A pin 3 through the photoelectric coupler forms a loop of current through a grounding system, drives the conduction of the pin 1 and pin 2 of the photoelectric coupler, and then drives the high-voltage relay to intelligently controls the external temperature/humidity control devices and the like, thereby achieving the effective control of the temperature/humidity. From the flow, the NPN triode is adopted and high-voltage anti-interference treatment of circuits of the two electrodes of the photoelectric coupler guarantees the stability of the circuit system.

Figure 20:
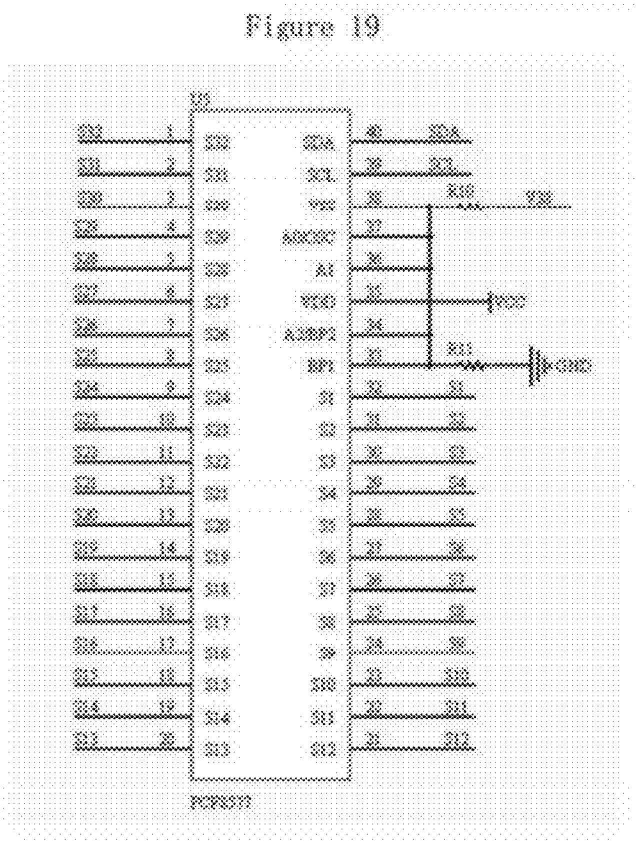
FIG. 20 is the circuit principle diagram of the I/O extended interface of each slave control end. of the invention.

According to the I/O extended interface as shown in FIG. 20, because the third microprocessor of each slave control end is difficult to provide multiple paths of output port control wires to control the peripheral driving circuit, for example, the switch elements of an MOS, a thyristor, a relay and the like, once the system controls the multiple paths of tissue culture lights, the control capability of the third microprocessor is powerless, and the superior performances of the controller are not shown. In order to solve the bottleneck, a (PCF8577) I/O interface extended chip in a 12C communication mode is adopted, and can extend to 32 I/O interfaces, and the defects of the I/O interface of the third microprocessor of each slave control end can be solved only through, providing DC 5V voltage and system ground (GND) as well as two 12C control wires, thus more peripheral control circuit units can be constructed for controlling the plant tissue culture light.

What is claimed is:

1. A wireless network based plant tissue culture LED (light-emitting diode) light source control system comprising:

a master control end and a plurality of slave control ends;

a first microprocessor, a second microprocessor;

a memory, a real-time clock, a display device, a temperature sensor, a humidity sensor, a serial communication interface (SCI), a USB (Universal Serial Bus) communication interface, operation keys and control software embedded in the first and second microprocessors;

the first microprocessor is connected with the second microprocessor through an SPI (serial peripheral interface) bus;

the memory is connected with the first microprocessor through a data line;

the real-time clock, the display device, the temperature sensor, the humidity sensor and the operation keys are respectively connected with the second microprocessor through the data line; the SCI and the USB communication interface are arranged, on the second microprocessor;

each slave control end comprises a third microprocessor, an extended memory, a real-time clock, an SCI, a temperature sensor, a humidity sensor, an I/O (input/output) extended interface and control software embedded in the third microprocessor; wherein the third microprocessor and the first microprocessor are communicated by adopting a ZIGBEE mode;

the extended memory, the real-time clock, the temperature sensor and the humidity sensor are respectively connected with the third microprocessor through the data line; and the SCI and the I/O extended interface are arranged on the third microprocessor.

2. The wireless network based plant tissue culture LED light source control system according to claim 1, characterized in that a CC2430 chip is adopted for the first microprocessor, and 51 inner cores are integrated in the 2430 chip.

3. The wireless network based plant tissue culture LED light source control system according to claim 1, characterized in that a singlechip of the AVR Mega series is adopted for the second, microprocessor.

4. The wireless network based plant tissue culture LED light source control system according to claim 1, characterized in that the temperature sensor is internally provided with a temperature detection circuit and a control circuit, and the humidity sensor is internally provided with a humidity detection circuit and a control circuit.

5. The wireless network based plant tissue culture LED light source control system according to claim 1, characterized in that A/D conversion-type buttons are adopted for the operation buttons.

6. The wireless network based plant tissue culture LED light source control system according to claim 1, characterized in that a dot-matrix liquid crystal display is adopted for the display device.

* * * * *